United States Patent Office 3,551,563
Patented Dec. 29, 1970

3,551,563
HALO-SUBSTITUTED PHENYL THIOPHOSPHONATES AS INSECTICIDES
Sidney B. Richter, Chicago, Ill., assignor to Velsicol Chemical Corporation, Chicago, Ill., a corporation of Illinois
No Drawing. Original application Oct. 11, 1965, Ser. No. 494,909, now Patent No. 3,459,836, dated Aug. 5, 1969. Divided and this application Dec. 13, 1968, Ser. No. 823,198
Int. Cl. A01n 9/36
U.S. Cl. 424—222      4 Claims

ABSTRACT OF THE DISCLOSURE

This invention discloses the use as insecticides of new chemical compounds having the formula

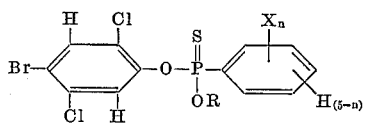

wherein R is alkyl; X is selected from the group consisting of alkyl, alkoxy, alkylthio, halogen, nitro and mixtures thereof; and $n$ is an integer from 0 to 5, provided that a maximum of three X's are nitro.

---

This application is a division of my copending application, Ser. No. 494,909, filed Oct. 11, 1965, now U.S. Pat. No. 3,459,836.

This invention relates to new chemical compositions of matter. More particularly, this invention relates to new chemical compounds having the formula

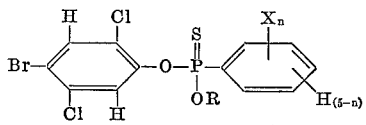

wherein R is alkyl; X is selected from the group consisting of alkyl, alkoxy, alkylthio, halogen, nitro and mixtures thereof, and $n$ is an integer from 0 to 5, provided that a maximum of three X's are nitro.

Although during the last several decades numerous insecticides have been introduced and many successfully used to control insect pests, particularly in agricultural applications, there is a continued need for selective insecticides. Selective insecticides are of particular importance as they control specific species of insects without destroying or substantially injuring other insects. Selective insecticides are valuable in controlling one or more specific insect pests in an area where many different species of insects are present. Hence, there is a basic need for selective insecticides.

Therefore, it is one object of the present invention to provide new chemical compositions of matter.

Another object of this invention is to provide selective insecticides.

Still another object of the present invention is to provide insecticides which are injurious to specific species of insects and harmless to other species.

These and other objects and advantages of the present invention will be apparent from the ensuing description and examples.

The compounds of the present invention have the general formula heretofore described. In a preferred embodiment of this invention the compounds have this general formula wherein R is alkyl containing from 1 to 10 carbon atoms; X is selected from the group consisting of alkyl containing from 1 to 6 carbon atoms, alkoxy containing from 1 to 6 carbon atoms, alkylthio containing from 1 to 6 carbon atoms, chlorine, bromine, nitro and mixtures thereof; and $n$ is an integer from 0 to 3. Exemplary of the compounds of the present invention are:

O-methyl O-2,5-dichloro-4-bromophenyl phenylthiophosphonate,
O-ethyl O-2,5-dichloro-4-bromophenyl phenylthiophosphonate,
O-n-propyl O-2,5-dichloro-4-bromophenyl phenylthiophosphonate,
O-methyl O-2,5-dichloro-4-bromophenyl 2,4-dichlorophenylthiophosphonate,
O-ethyl O-2,5-dichloro-4-bromophenyl 2-methyl-4-chlorophenylthiophosphonate,
O-ethyl O-2,5-dichloro-4-bromophenyl 4-nitrophenylthiophosphonate,
O-ethyl O-2,5-dichloro-4-bromophenyl 4-methoxyphenylthiophosphonate,
O-ethyl O-2,5-dichloro-4-bromophenyl 2-chloro-4-nitrophenylthiophosphonate,
O-ethyl O-2,5-dichloro-4-bromophenyl 3-methylphenylthiophosphonate,
O-ethyl O-2,5-dichloro-4-bromophenyl 2-methylphenylthiophosphonate,
O-ethyl O-2,5-dichloro-4-bromophenyl 4-methylphenylthiophosphonate,
O-ethyl O-2,5-dichloro-4-bromophenyl 4-methylthiophenylthiophosphonate, and the like.

These new compounds can be prepared readily by reacting 2,5-dichloro-4-bromophenol with the corresponding O-alkyl phenylthiophosphonyl halide. This latter compound can be prepared from the corresponding phenylthionophosphonic dichloride by treatment with an alkyl alcohol.

The manner in which the compounds of the present invention can be prepared is illustrated in the following examples:

EXAMPLE 1

Preparation of O-methyl O-2,5-dichloro-4-bromophenyl phenylthiophosphonate 2,5-dichloro-4-bromophenol (7.5 g.; 0.025 mole) was dissolved in acetone (25 ml.) and placed in a three-neck, round-bottom flask equipped with a mechanical stirrer, internal thermometer and reflux condenser. A solution of sodium hydroxide (1 g.; 0.025 mole) in water (5 ml.) was added to the flask. The contents were stirred and a solution of O-methyl phenylthiophosphonyl chloride (5.2 g.; 0.025 mole) in acetone (25 ml.) was slowly added to the flask. The reaction mixture was stirred and heated at reflux for 15 minutes and then cooled. The reaction mixture was filtered and the filtrate distilled in vacuo to remove the acetone. The residue was extracted with diethyl ether and the extract washed with a 5% aqueous solution of sodium hydroxide (100 ml.) and then twice with water. The ether extract was dried over magnesium sulfate, filtered, and the filtrate heated under reduced pressure to remove diethyl ether and recover O-methyl O-2,5-dichloro-4-bromophenyl phenylthiophosphonate as a light yellow liquid residue having a refractive index at 22° C. of 1.6385 which solidifies on standing.

EXAMPLE 2

Preparation of O-ethyl O-2,5-dichloro-4-bromophenyl phenylthiophosphonate

A solution of potassium hydroxide (3.4 g.) in water (10 ml.) was added to a solution of 2,5-dichloro-4-bromophenol (12.2 g.) in acetone (100 ml.) in a three-neck, round bottom flask equipped with a mechanical stirrer and reflux condenser. The mixture was stirred and heated at reflux. A solution of O-ethyl phenylthiophosphonyl chloride (13.2 g.) in acetone (50 ml.) was gradually added to the stirred refluxing mixture. After the addition was complete the mixture was stirred and heated at reflux for 15 minutes and then cooled. The reaction mixture was heated on a steam bath to remove acetone. The residue was extracted with diethyl ether, the extract washed with cold aquous sodium hydroxide and with ice water and finally dried over calcium chloride. The extract was filtered from the calcium chloride crystals and heated under reduced pressure to remove the diethyl ether and then filtered through a fritted glass filter to recover O-ethyl O-2,5-dichloro-4-bromophenyl phenylthiophosphonate as a liquid having a refractive index at 26° C. of 1.6203 which solidifies on standing.

EXAMPLE 3

Preparation of O-n-propyl 0-2,5-dichloro-4-bromophenyl phenylthiophosphonate 2,5-dichloro-4-bromophenol (3.5 g.; 0.013 mole) was dissolved in acetone (25 ml.) and placed in a three-neck round-bottom flask equipped with a mechanical stirrer, internal thermometer and reflux condenser. An aqueous solution of 3.0 N sodium hydroxide (5 ml.) was added to the flask. The contents were stirred and O-n-propylphenylthiophosphonyl chloride (3 g.; 0.013 mole)3 was slowly added. The reaction mixture was refluxed for 15 minutes and then cooled. The reaction mixture was heated under reduced pressure to remove the acetone and the residue was dissolved in diethyl ether, washed with 5% aqueous sodium hydroxide solution (100 ml.), washed twice with water, dried over magnesium sulfate and filtered. The filtrate was heated in vacuo to remove the diethyl ether and to yield O-n-propyl O-2,5-dichloro-4-bromophenyl phenylthiophosphonate as the liquid residue having a refractive index at 22° C. of 1.5992.

In the manner heretofore described other compounds within the scope of the present invention can be readily prepared. Presented in the following examples are the essential ingredients required to prepare the indicated named compounds according to the procedure detailed in the foregoing examples. For the sake of brevity 2,5-dichloro-4-bromophenol will be designated as A.

EXAMPLE 4

A+O - methyl 2,4-dichlorophenylthiophosphonyl chloride=O-methyl O-2,5-dichloro-4-bromophenyl 2,4-dichlorophenylthiophosphonate.

EXAMPLE 5

A+O - ethyl 2 - methyl-4-chlorophenylthiophosphonyl chloride=O-ethyl O-2,5-dichloro-4-bromophenyl 2-methyl-4-chlorophenylthiophosphonate.

EXAMPLE 6

A+O-ethyl 4-nitrophenylthiophosphonyl chloride=O-ethyl O - 2,5-dichloro-4-bromophenyl 4-nitrophenylthiophosphonate.

EXAMPLE 7

A+O-ethyl 2-chloro-4-nitrophenylthiophosphonyl chloride=O-ethyl O-2,5-dichloro-4-bromophenyl 2-chloro-4-nitrophenylthiophosphonate.

EXAMPLE 8

A+O - ethyl 3 - methylphenylthiophosphonyl chloride=O - ethyl O-2,5-dichloro-4-bromophenyl 3-methylphenylthiophosphonate.

EXAMPLE 9

A+O - ethyl 2 - methylphenylthiophosphonyl chloride=O - ethyl O-2,5-dichloro-4-bromophenyl 2-methylphenylthiophosphonate.

EXAMPLE 10

A+O -ethyl 4 - methylphenylthiophosphonyl chloride=O - ethyl O-2,5-dichloro-4-bromophenyl 4-methylphenylthiophosphonate.

For practical use as selective insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids such as dusts, granules, or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 11

Preparation of a dust

Product of Example 1 _____ 10
Powdered talc _____ 90

The above ingredients are mixed in a mechanical grinder-blender and are ground until a homogenous, free-flowing dust of the desired particle size is obtained. This dust is suitable for direct application to the site of the insect infestation.

The compounds of this invention can be applied as insecticides in any manner recognized by the art. One method for destroying insects comprises applying to the locus of the insect infestation, an insecticidal composition comprising an inert carrier and as the essential active ingredient, in a quantity which is toxic to said insects, a compound of the present invention. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to about 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with the other insecticides in the insecticidal compositions heretofore described. These other insecticides can comprise from about 5% to about 95% of the active ingredients in the insecticidal compositions. Use of the combinations of these other insecticides with the compounds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, methoxychlor, TDE, lindane, chlordane, isobenzan, aldrin, dieldrin, heptachlor, endrin, mirex, endosulfon, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, azobenzene, and the like; organic carbamate compounds such as carbaryl and the like; organic sulfur compounds such as phenothiszine, phenoxathin, lauryl thiocyanate, bis(2-thiocyanoethyl) ether, isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal chemical compounds to form pesticidal compositions useful for the control of fungi and in some cases soil nematodes as well as insects. Typical examples of such fungicidal chemical compounds are ferbam, nabam, zineb, ziram, thiram, chloranil, dichlone, glyodin, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plants surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the Southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxers. Insects which attack below the surface of the ground are classified as subterranean insects and include such destructive pests as the wooly apple aphid, the Japanese bettle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

The compounds of the present invention are particularly valuable since they are selective in their insecticidal action. For example, the compounds are particularly effective against insects of the order Lepidoptera, such as the Southern armyworm, while they are non-toxic to other insects even insects having the same feeding habits.

The insecticidal utility of the compounds of the present invention can be demonstrated by various experiments recognized by the art. In one series of experiments the test compounds were formulated by dissolving the compounds in acetone and dispersing the acetone solution in distilled water containing 0.2% by volume of alkyl aryl polyether alcohol type emulsifiers.

In one experiment carried out for the control of insect pests by feeding, lima bean leaves were sprayed on the top and bottom surfaces with the above formulation at the concentration indicated below and offered to ten larvae of the Southern armyworm (late third instar stage) for a feeding period of 48 hours. After this period the mortality was observed. Some of the results were as follows:

TABLE I

| Test chemical | Concentration, percent actual chemical in liquid sprayed | Percent mortality |
|---|---|---|
| Product of Example 1 | 0.01 | 100 |
| Do | 0.001 | 90 |
| Product of Example 2 | 0.01 | 100 |
| Do | 0.0075 | 100 |
| Do | 0.005 | 100 |
| Do | 0.0025 | 90 |

I claim:
1. An insecticidal composition comprising an inert carrier and in a quantity which is toxic to said insects, a compound selected from the group consisting of O-methyl O-2,5-dichloro - 4 - bromophenyl phenylthiophosphonate and O-ethyl O-2,5-dichloro - 4 - bromophenyl phenylthiophosphonate.

2. A method of destroying undesirable insects which comprises contacting said insects with an insecticidal composition of claim 1.

3. The method of claim 2 wherein the compound is O-methyl O-2,5 - dichloro-4-bromophenyl phenylthiophosphonate.

4. The method of claim 2 wherein the compound is O-ethyl O-2,5-dichloro-4-bromophenyl phenylthiophospphonate.

References Cited

UNITED STATES PATENTS 3,099,597  7/1963  Chupp et al. _____ 260—961
3,356,772  12/1967  Buck et al. _____ 260—961

FOREIGN PATENTS 11,699  1962  Japan _____ 260—961

STANLEY J. FRIEDMAN, Primary Examiner

U.S. Cl. X.R.

424—218